US012368241B2

(12) United States Patent
Göttl

(10) Patent No.: US 12,368,241 B2
(45) Date of Patent: Jul. 22, 2025

(54) MOBILE COMMUNICATION ANTENNA FOR TRANSMITTING AND/OR RECEIVING MOBILE COMMUNICATION SIGNALS

(71) Applicant: Telefonaktiebolaget LM Ericsson (publ), Stockholm (SE)

(72) Inventor: Maximilian Göttl, Frasdorf (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 18/027,740

(22) PCT Filed: Sep. 23, 2020

(86) PCT No.: PCT/EP2020/076591
§ 371 (c)(1),
(2) Date: Mar. 22, 2023

(87) PCT Pub. No.: WO2022/063399
PCT Pub. Date: Mar. 31, 2022

(65) Prior Publication Data

US 2023/0378648 A1 Nov. 23, 2023

(51) Int. Cl.
*H01Q 5/42* (2015.01)
*H01Q 5/35* (2015.01)
*H01Q 21/24* (2006.01)

(52) U.S. Cl.
CPC ................. *H01Q 5/42* (2015.01); *H01Q 5/35* (2015.01); *H01Q 21/24* (2013.01)

(58) Field of Classification Search
CPC ............ H01Q 5/42; H01Q 5/35; H01Q 21/24; H01Q 1/246
See application file for complete search history.

(56) References Cited

U.S. PATENT DOCUMENTS 11,329,390 B2 5/2022 Gött
2019/0273315 A1 9/2019 Hu et al.
(Continued)

FOREIGN PATENT DOCUMENTS

DE 10 2018 120 612 A1 8/2019
WO 2004/051796 A1 6/2004

OTHER PUBLICATIONS

International Search Report and Written Opinion issued in International Application No. PCT/EP2020/076591 dated Jun. 15, 2021 (12 pages).

*Primary Examiner* — David E Lotter
(74) *Attorney, Agent, or Firm* — Rothwell, Figg, Ernst & Manbeck, P.C.

(57) ABSTRACT

A mobile communication antenna (1) comprises a reflector arrangement (3) and a first radiator array (5*a*) with dual-polarized radiators (2) and a second radiator array (5*b*) with dual-polarized radiators (2). Each radiator (2) comprises four feed sections (7*a*, 7*b*, 7*c*, 7*d*). At least one radiator (2) is configured to transmit and receive four different mobile communication signals (S1, S2, S3, S4) via the first, second, third and fourth feed sections (7*a*, 7*b*, 7*c*, 7*d*), thereby forming a multi signal radiator (2*b*). The remaining radiators (2) of the first and second radiator array (5*a*) are configured to transmit and receive two different mobile communication signals (S1, S2, S3, S4) of these four different mobile communication signals (S1, S2, S3, S4) via the first, second, third and fourth feed sections (7*a*, 7*b*, 7*c*, 7*d*), thereby forming a dual signal radiator (2*a*).

16 Claims, 12 Drawing Sheets

(56) References Cited

U.S. PATENT DOCUMENTS

| | | | | |
|---|---|---|---|---|
| 2020/0006862 | A1* | 1/2020 | Thompson, Jr. ....... | H01Q 1/246 |
| 2020/0412011 | A1* | 12/2020 | Bisiules ................. | H01Q 1/246 |
| 2021/0083397 | A1* | 3/2021 | Göttl ........................ | H01Q 5/40 |

* cited by examiner

MOBILE COMMUNICATION ANTENNA FOR TRANSMITTING AND/OR RECEIVING MOBILE COMMUNICATION SIGNALS

CROSS REFERENCE TO RELATED APPLICATIONS

This application is a 35 U.S.C. § 371 National Stage of International Patent Application No. PCT/EP2020/076591, filed 2020 Sep. 23.

TECHNICAL FIELD

The invention relates to a mobile communication antenna for transmitting and/or receiving mobile communication signals.

BACKGROUND

A mobile communication antenna comprises a plurality of components. In order to support various mobile communication bands different types of radiators have to be used. Furthermore, not only one radiator is used for transmitting and/or receiving communication signals of the first communication band, but a plurality of radiators. Those radiators are normally arranged along the longitudinal axis of the mobile communication antenna. By varying the phase angle of the signal which is fed to the plurality of radiators for each of the radiators or for some of the radiators independently, the down tilt angle of the mobile communication antenna can be adjusted.

In order to support more mobile communication bands for example, a mobile communication antenna often comprises a first radiator array and a second radiator array arranged next to each other. Each radiator array preferably comprises a plurality of dual-polarized radiators. Those radiators allow transmitting and/or receiving mobile communication signals of a first polarization and of a second polarization. For example, the radiators of the first radiator array may be used to transmit and/or receive mobile communication signals of a first and a second polarization of a first mobile communication band, wherein the radiators of the second radiator array may be used to transmit and/or receive mobile communication signals of a first and a second polarization of a second mobile communication band.

However, the size of the radiators varies depending on the frequencies. Radiators used for transmitting and/or receiving communication signals in a lower frequency range have larger dimensions than radiators used for transmitting and/or receiving communication signals in a higher frequency range. Mobile communication antennas having smaller dimensions are in favor, because the rents for the installation site are less expensive and the manufacturing costs are also reduced.

Furthermore, depending on the application, a smaller half power beam width is needed in some installations resulting in a higher antenna gain. Such a smaller half power beam width can be achieved by enlarging the reflector arrangement so that it protrudes the radiators on both sides. This in turn results in a larger mobile communication antenna.

WO 2004/051796 A1 describes a two-dimensional antenna array, wherein each antenna array comprises a plurality of radiators. However, not all radiators of the first antenna array are used to transmit and/or receive a first mobile communication band and not all radiators of the second antenna array are used to transmit and/or receive a second mobile communication band. Instead WO 2004/051796 suggests that at least one radiator of the first antenna array transmits and/or receives a second mobile communication band, wherein at least one radiator of the second antenna array transmits and/or receives a first mobile communication band. As such, the half power beam width is reduced and the antenna gain is increased.

SUMMARY

An object of the present invention is seen in building a mobile communication antenna which has a half power beam width that is comparable to the one of the state-of-the-art, but which has smaller dimensions.

The object is solved by a mobile communication antenna according to claim 1. The dependent claims describe further embodiments of the mobile communication antenna.

The mobile communication antenna is used for transmitting and/or receiving mobile communication signals. As such, a reflector arrangement is provided, which extends in the longitudinal direction of the mobile communication antenna. The reflector arrangement could be made of a single electrically conductive piece or of a plurality of electrically conductive pieces. Those pieces could be metal sheets or even plastics covered with a metal layer. Furthermore, a first radiator array is provided. The first radiator array comprises m dual-polarized radiators which are spaced apart from each other in the longitudinal direction, with $m \geq 4, 5, 6, 7, 8, 9, 10, 11, 12, 13, 14$. In addition, a second radiator array is provided. The second radiator array comprises n dual-polarized radiators which are spaced apart from each other in the longitudinal direction, with $n \geq 4, 5, 6, 7, 8, 9, 10, 11, 12, 13, 14$. Preferably m equals n. The first and the second radiator arrays are arranged side-by-side (next to each other) on the same side of the reflector arrangement. Preferably, the first radiator of the first radiator array is located next (for example only spaced in the horizontal direction) to the first radiator of the second radiator array. More preferably, the last radiator of the first radiator array is located next to the last radiator of the second array. Each radiator of the first radiator array comprises four feed sections for transmitting and receiving at least one mobile communication signal. Each radiator of the second radiator array comprises four feed sections for transmitting and receiving at least one mobile communication signal. The first and a third feed sections of each radiator are arranged diagonally spaced from each other and configured to transmit and receive mobile communication signals with a first polarization. The second and the fourth feed sections of each radiator are also arranged diagonally spaced from each other and configured to transmit and receive mobile communication signals with a second polarization. Preferably, the distance between the first and the third feed sections is the same as the distance between the second and the fourth feed sections. Furthermore, at least one radiator of the first and/or second radiator array is configured to transmit and receive four different mobile communication signals via the first, second, third and fourth feed sections, thereby operating as a multi signal radiator. The remaining radiators (the ones not operating as a multi signal radiator) of the first radiator array are configured to transmit and receive two different mobile communication signals out of those four different mobile communication signals via the first, second, third and fourth feed sections, thereby operating as a dual signal radiator. The remaining radiators (the ones not operating as a multi signal radiator) of the second radiator array are configured to transmit and receive two different mobile communication signals out of those four different mobile communication signals via the first, second, third and fourth feed sections, thereby operating as dual signal radiator.

It is very beneficial that at least one radiator is operating as multi signal radiator thereby being able to transmit and receive four different mobile communication signals. Together with the radiator arranged next to the multi signal radiator, the respective feed sections which are used to transmit the same mobile communication signal (same signal and same polarization) are either spaced further away which reduces the half power beam width thereby increasing the antenna gain or are arranged more centered on the reflector arrangement so that the reflector arrangement protrudes further of the respective feed sections thereby reducing the half power beam width so that the antenna gain is increased. It is very beneficial, that no new radiators have to be developed so that existing radiators can still be used. The electrical properties of such an antenna are surprisingly good.

In a preferred embodiment of the present invention the first feed section for each radiator of the first and the second radiator array is located adjacent to the fourth feed section. Preferably, the first feed section is only spaced apart from the fourth feed section by a vector that is perpendicular to the longitudinal axis. This means, that the first feed section of one radiator is preferably arranged at the same height within the mobile communication antenna as the fourth feed section of the same radiator. The same is also true for the second feed section and the third feed section which are also located adjacent to each other. Contrary to that, the first feed section is arranged at a longitudinal distance from the second feed section and the fourth feed section is arranged at a longitudinal distance from the third feed section. Preferably, when the mobile communication antenna is mounted in the vertical position, then the first feed section is preferably arranged above the second feed section and the fourth feed section is preferably arranged above the third feed section. When thinking of the radiators in the first radiator array, then the first and the second feed sections are outer feed sections which are arranged adjacent to a first end of the reflector arrangement. Contrary to that, the third and the fourth feed sections of the radiators of the first radiator array are inner feed sections which are arranged adjacent to the second radiator array. When thinking of the radiators in the second radiator array, then the first and the second feed sections are inner feed sections which are arranged adjacent to the first radiator array. Contrary to that, the third and the fourth feed sections of the radiators of the second radiator array are outer feed sections which are arranged adjacent to a second end of the reflector arrangement.

Each feed section is configured to transmit and receive a mobile communication signal of only one polarization. For example, the respective radiator is configured to transmit and receive a mobile communication signal of a first polarization only at the first and third feed sections. Contrary to that, the same radiator is configured to transmit and receive a mobile communication signal of a second polarization only at the second and fourth feed sections.

In a preferred embodiment of the present invention, a dual signal radiator that can be used in the first radiator array is preferably of a type 1 (first type). Such a type 1 dual signal radiator is configured to transmit and receive a first mobile communication signal with the first polarization at the first feed section and the third feed section. Furthermore, such a type 1 dual signal radiator is also configured to transmit and receive a second mobile communication signal with the second polarization at the second feed section and the fourth feed section. Contrary to that, the dual signal radiator can also be used in the second radiator array. In that case, the dual signal radiator is preferably of type 2 (second type). Such a type 2 dual signal radiator is configured to transmit and receive a third mobile communication signal with the first polarization at the first feed section and the third feed section. Furthermore, such a type 2 dual signal radiator is also configured to transmit and receive a fourth mobile communication signal with the second polarization at the second feed section and the fourth feed section.

In a preferred embodiment of the present invention, all remaining radiators in the first radiator array (the ones which are not operated as multi signal radiator) are solely dual signal radiators of the first type. Alternatively, the first and/or the last radiator in the first radiator array is a dual signal radiator of the second type, wherein the other remaining radiators (the ones which are not operated as multi signal radiators and dual signal radiators of type 2) are dual signal radiators of the first type. All remaining radiators in the second radiator array (the ones which are not operated as multi signal radiator) are solely dual signal radiators of the second type. Alternatively, the first and/or the last radiator in the second radiator array is a dual signal radiator of the first type, wherein the other remaining radiators (the ones which are not operated as multi signal radiators and dual signal radiators of type 1) are dual signal radiators of the second type. This further reduces the half power beam width.

In another preferred embodiment of the present invention at least one multi signal radiator is arranged in the first radiator array and at least one multi signal radiator is arranged in the second radiator array. More preferably, at least two multi signal radiators are arranged in the first radiator array and at least two multi signal radiators are arranged in the second radiator array. This further reduces the half power beam width.

In another preferred embodiment of the present invention a multi signal radiator in the first radiator array is arranged next (at the same height) to a multi signal radiator in the second radiator array. In addition or alternatively, a multi signal radiator in the first radiator array is diagonally spaced to multi signal radiator in the second radiator array. The wording "diagonally spaced" can be understood in such a way that the respective multi signal radiators in the first and second radiator array are only spaced from each other by one row or by more rows. For example, one multi signal radiator could be the first or the last radiator in the first radiator array, wherein one multi signal radiator could be the last or the first radiator in the second radiator array.

In another preferred embodiment, a multi signal radiator in the first radiator array is arranged at the same height as a multi signal radiator in the second radiator array or is diagonally spaced preferably by only one row from a multi signal radiator in the second radiator array. In that case, the respective feed sections of both multi signal radiators which transmit and receive the same mobile communication signal (same signal, same polarization) are galvanically connected to each other.

In another preferred embodiment the multi signal radiator could be a type I (first type), type II (second type), type III (third type) or a type IV (fourth type) multi signal radiator. The multi signal radiator operates as a type I radiator if it is configured to transmit and receive a first mobile communication signal with the first polarization at the first feed section and if it is configured to transmit and receive a second mobile communication signal with the second polarization at the second feed section and if it is configured to transmit and receive a third mobile communication signal with the first polarization at the third feed section and if it is configured to transmit and receive a fourth mobile communication signal with the second polarization at the fourth feed section.

The multi signal radiator operates as a type II radiator if it is configured to transmit and receive a third mobile communication signal with the first polarization at the first feed section and if it is configured to transmit and receive a second mobile communication signal with the second polarization at the second feed section and if it is configured to transmit and receive a first mobile communication signal with the first polarization at the third feed section and if it is configured to transmit and receive a fourth mobile communication signal with the second polarization at the fourth feed section.

The multi signal radiator operates as a type III radiator if it is configured to transmit and receive a third mobile communication signal with the first polarization at the first feed section and if it is configured to transmit and receive a fourth mobile communication signal with the second polarization at the second feed section and if it is configured to transmit and receive a first mobile communication signal with the first polarization at the third feed section and if it is configured to transmit and receive a second mobile communication signal with the second polarization at the fourth feed section.

The multi signal radiator operates as a type IV radiator if it is configured to transmit and receive a first mobile communication signal with the first polarization at the first feed section and if it is configured to transmit and receive a fourth mobile communication signal with the second polarization at the second feed section and if it is configured to transmit and receive a third mobile communication signal with the first polarization at the third feed section and if it is configured to transmit and receive a second mobile communication signal with the second polarization at the fourth feed section.

The best results are achieved if the multi signal radiator in the first radiator array is a type I or type III radiator and if the multi signal radiator in the second radiator array is a type III or type I radiator, because then the outer feed sections are used to transmit and receive the first and the second mobile communication signals and because the inner feed sections are used to transmit and receive the third and the fourth mobile communication signals (type I<->type III) or vice versa (type III<->type I). In that case, the feed sections which are used to transmit the first and the second mobile communication signals are spaced further away compared to a dual signal radiator so that the half power beam width is reduced. On the other hand, the feed sections which are used to transmit the third and the fourth mobile communication signals are protruded further by the reflector arrangement on both sides compared to a dual signal radiator so that half power beam width is reduced.

In another embodiment of the present invention the first radiator array comprises at least one, two, three or at least four multi signal radiators. Each of the multi signal radiators in the first radiator array can be selected from type I, type II, type III or type IV. The second radiator array comprises at least one, two, three or at least four multi signal radiators. Each of the multi signal radiators in the second radiator array can be selected from type I, type II, type III or type IV.

In another preferred embodiment of the present invention the first radiator in the first radiator array is a multi signal radiator of type I or alternatively type III and/or the last radiator in the first radiator array is a multi signal radiator of type III or alternatively type I. In addition or alternatively, the first radiator in the second radiator array is a multi signal radiator of type III or alternatively type I and/or the last radiator in the second radiator array is a multi signal radiator of type I or alternatively type III. In that case, there is multi signal radiator of type I in the first radiator array for example, wherein the adjacent multi signal radiator in the second radiator array is of type III or vice versa. In that case, the results of the antenna regarding the antenna again are good.

In another preferred embodiment of the present invention m is an even number, wherein the two radiators in the center of the first radiator array are multi signal radiators of type I and type III. In addition, n is an even number, wherein the two radiators in the center of the second radiator array are multi signal radiators of type III and type I.

In another preferred embodiment of the present invention four phase shifters are provided. The first phase shifter is configured to feed (forward) a first mobile communication signal which has to be transmitted and which has a first polarization with a different phase angle to at least some or all of the respective radiators emitting this first mobile communication signal. The second phase shifter is configured to feed (forward) a second mobile communication signal which has to be transmitted and which has a second polarization with a different phase angle to at least some or all of the respective radiators emitting this second mobile communication signal. The third phase shifter is configured to feed (forward) a third mobile communication signal which has to be transmitted and which has a first polarization with a different phase angle to at least some or all of the respective radiators emitting this third mobile communication signal. The fourth phase shifter is configured to feed (forward) a fourth mobile communication signal which has to be transmitted and which has a second polarization with a different phase angle to at least some or all of the respective radiators emitting this fourth mobile communication signal. The respective radiators can be dual signal radiators and/or multi signal radiators in the first and/or second radiator array.

In another preferred embodiment of the present invention the first mobile communication signal which has a first polarization has a bandwidth that corresponds to a part of the bandwidth of a first mobile communication band that also has a first polarization. It could also be possible that the bandwidth of the first mobile communication signal equals the bandwidth of the entire first mobile communication percent having the first polarization. In that case, the first mobile communication signal with the first polarization is the first mobile communication band with the first polarization. The same is also true for the second mobile communication signal having a second polarization. The second mobile communication signal with the second polarization could have a bandwidth that corresponds to a part of the bandwidth of the first mobile communication band with the second polarization or which corresponds to the entire first mobile communication band with the second polarization. The same is also true for the third mobile communication signal having a first polarization. The third mobile communication signal with the first polarization could have a bandwidth that corresponds to a part of the bandwidth of the second mobile communication band with a first polarization or which corresponds to the entire second mobile communication band with the first polarization. The same is also true for the fourth mobile communication signal having a second polarization. The fourth mobile communication signal with the second polarization could have a bandwidth that corresponds to a part of the bandwidth of the second mobile communication band with a second polarization or which corresponds to the entire second mobile communication band with the second polarization.

In another preferred embodiment of the present invention each radiator of the first radiator array and each radiator of the second radiator array comprises four radiator segments. Each radiator segment is aligned by approximately 90° relative to its neighboring radiator segments so that the four radiator segments enclose a receiving room. Two radiator segments join each other thereby forming a corner, wherein the respective feed section is arranged in the area of the respective corner. A slot is preferably formed between the two neighboring radiator segments so that they are more preferably not connected galvanically to each other. The slot runs preferably at least partly in a zigzag manner. When a mobile communication signal is applied to the respective feed section at the corner of two adjoining segments, then both segments are used to transmit the respective mobile communication signal with the first or second polarization.

In another preferred embodiment of the present invention a plurality of dual-polarized radiator systems are provided which are configured to transmit and/or receive mobile communication signals in two different polarizations.

The plurality of dual-polarized radiator systems is configured to be operable in a frequency range which is above the frequency range of the radiators of the first and second radiator array. Each of the dual-polarized radiator systems is arranged in the receiving room of several or all radiators of the first and/or 35 second radiator array. Furthermore, one dual-polarized radiator system is arranged between two radiators of the first and/or second radiator array. Each dual-polarized radiator system is preferably a cross dipole or vector dipole or vector dipole square. There could also be a director arranged on top of the dipole. Between the dipole and the reflector arrangement there could also be arranged at least one or two frames which are more preferably circumferential and spaced apart in the height direction. The at least one frame has preferably one or two recesses over its entire width.

The mobile communication antenna according to the present invention could also comprise a plurality of dual-polarized patch radiators. The dual-polarized patch radiators are configured to transmit and/or receive mobile communication signals in two different polarizations. The plurality of dual-polarized patch radiators is configured to be operable in a frequency range which is above the frequency range of the dual-polarized radiator system. The plurality of dual-polarized patch radiators is arranged on the reflector arrangement.

The dual-polarized radiators in the first and in the second radiator array could also be named as dual-polarized low band radiator. The dual-polarized radiator system could also be named as dual-polarized mid band radiator. The plurality of dual-polarized patch radiators could also be named as dual-polarized high band radiators.

The dual-polarized radiators in the first and in the second radiator array can preferably be operated in a frequency range of 698 to 960 MHz. The dual-polarized radiator system can preferably be operated in a frequency range of 1695 to 2700 MHz. The dual-polarized patch radiators could preferably be operated in a frequency range of 3300 to 3800 MHz.

BRIEF DESCRIPTION OF THE DRAWINGS

Different embodiments of the invention will be described in the following, by way of example and with reference to the drawings. The same elements are provided with the same reference signs. The figures show in detail.

DETAILED DESCRIPTION

Figure 1:
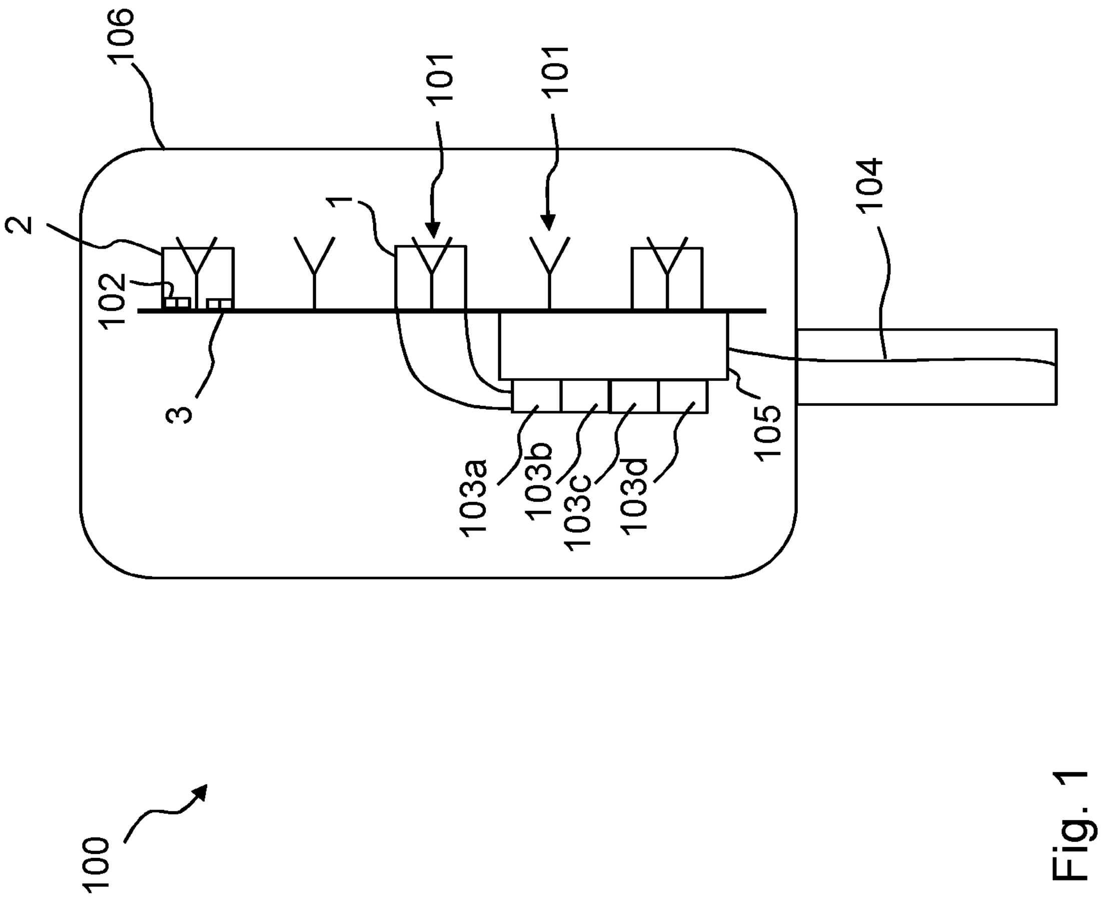
FIG. 1: a mobile communication antenna with a first and a second radiator array according to the present invention.

FIG. 1 shows a mobile communication antenna 1 with a plurality of dual-polarized radiators 2 and at least one dual-polarized radiator system 101 (optional). There is also a reflector arrangement 3 on which the plurality of dual-polarized radiators 2 and the at least one dual-polarized radiator system 101 are arranged. The at least one dual-polarized radiator system 101 and the plurality of dual-polarized radiators 2 are arranged on a first side of the reflector arrangement 3. It is also possible (optional) that at least a plurality of dual-polarized patch radiators 102 are used and arranged on that side.

The plurality of dual-polarized radiators 2 are spaced apart from each other in longitudinal direction of the mobile communication antenna 1. As will be described below, each dual-polarized radiator 2 encloses a receiving room 4. At least one dual-polarized radiator system 101 can be arranged in that receiving room 4. Between two dual-polarized radiators 2, another dual-polarized radiator system 101 is arranged. The dual-polarized radiators 2 are arranged in a first radiator array 5*a* and in a second radiator array 5*b*. The first and the second radiator arrays 5*a*, 5*b* are arranged side-by-side.

The dual-polarized radiator systems 101 (if used) are preferably arranged within the first and the second radiator array 5*a*, 5*b* and/or between the first and the second radiator array 5*a*, 5*b*. The same could also be true for the plurality of dual-polarized patch radiators 102 (if used). They could be arranged in the first and in the second radiator array 5*a*, 5*b* and/or between the first and the second radiator array 5*a*, 5*b*. The dual-polarized patch radiators 102 are arranged closer to the reflector arrangement 3 compared to the dual-polarized radiators 2 and the dual-polarized radiator systems 101.

The distance between two dual-polarized radiators 2 in the first and/or in the second radiator array 5*a*, 5*b* is preferably λ/2 or λ, wherein λ is the wave length of the mid-frequency of the mobile communication signal the dual-polarized radiator 2 is transmitting and/or receiving. The same is also true for the dual-polarized radiator systems 101 and/or for the dual-polarized patch radiators 102.

The dual-polarized radiators 2, the dual-polarized radiator system 101 and the dual-polarized patch radiators 102 are configured to transmit and/or receive mobile communication signals in two orthogonal polarizations. The orthogonal polarizations could be for example ±45°, linear, circular or elliptic.

On the second side of the reflector arrangement 3, a phase shifter arrangement for each of the two polarizations for the dual-polarized radiators 2, the dual-polarized radiator systems 101 and/or the dual-polarized patch radiators 102 could be arranged. More preferably, there is a first phase shifter 103*a*, a second phase shifter 103*b*, a third phase shifter 103*c* and the fourth phase shifter 103*d*, which are used to feed mobile communication signals to be transmitted to the respective radiator 2 in the first and/or second radiator array 5*a*, 5*b*.

In addition, a matching network could also be provided. Furthermore, a power amplifier configured to amplify signals which are intended to be transmitted through the mobile communication antenna 1 to various mobile devices could also be arranged on the second side of the reflector arrangement 3. Alternatively or in addition, a low noise amplifier could also be arranged on the second side of the reflector arrangement 3. Using the low noise amplifier (LNA) signals which are received through the mobile communication antenna 1 from various mobile devices could be amplified before being sent to the base station (not shown) via the feeder cables 104. Furthermore, one or more combiners 105 could also be arranged on the second side of the reflector arrangement 3. A common port of the respective combiner 105 could be connected to the central port of the respective phase shifter 103*a*, 103*b*, 103*c*, 103*d*. The TX-port and the RX-port could then be connected to the respective power amplifier or low noise amplifier. A radome 106 closes the mobile communication antenna 100.

The respective combiner 105 and the respective phase shifter 103*a*, 103*b*, 103*c*, 103*d* for each of the polarizations of the dual-polarized radiators 2 could be integrated in the same housing. The housing floor divides the receiving rooms for the respective combiner 105 and for the respective phase shifter 103*a*, 103*b*, 103*c*, 103*d*, wherein an opening between the housing floor is used to connect the common port of the respective combiner 105 to the respective phase shifter 103*a*, 103*b*, 103*c*, 103*d*. The housing is preferably made of metal, more preferably die-cast aluminum. Lids on both sides of the housing then close the respective receiving rooms.

Figure 2:
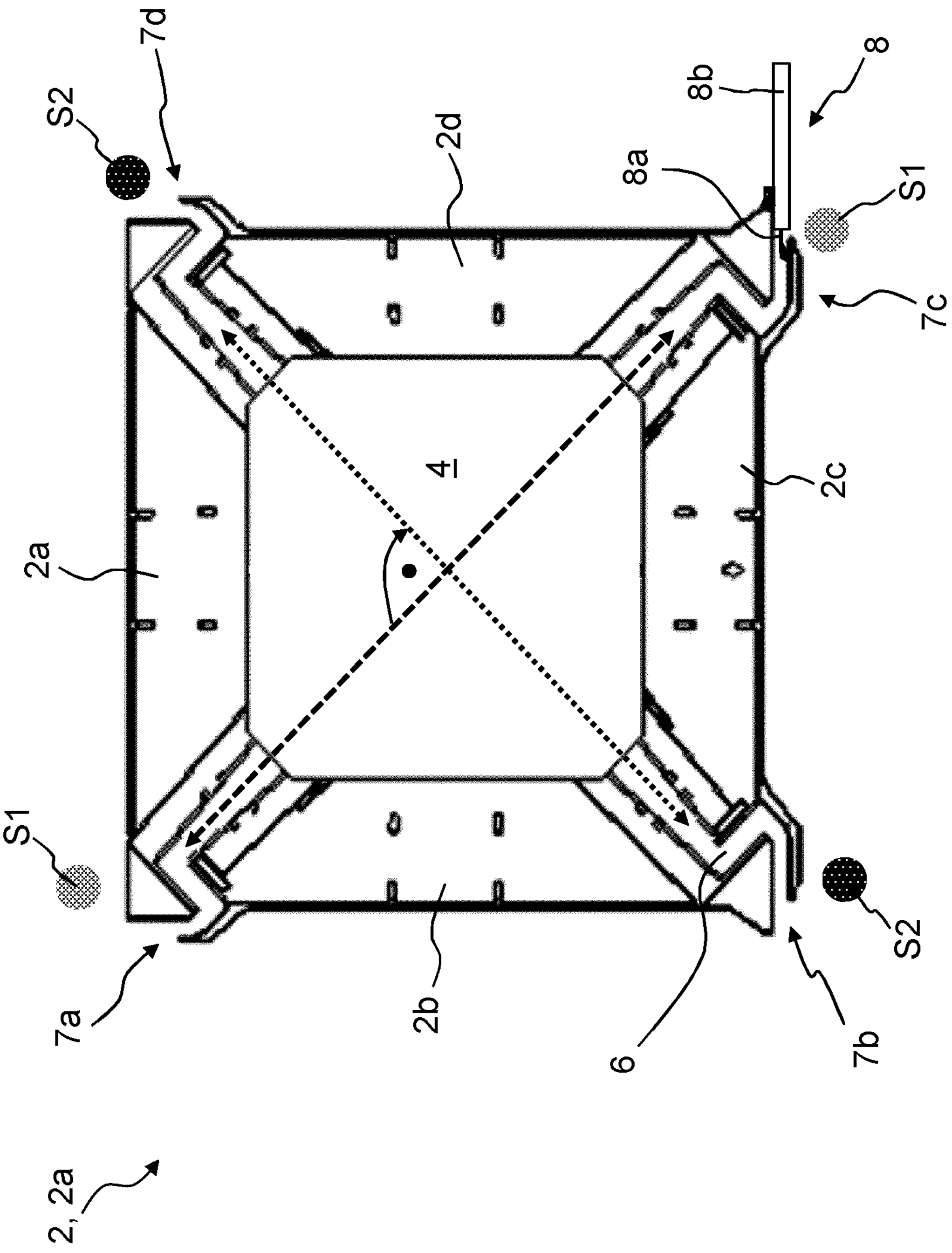
FIG. 2: an exemplary embodiment of a radiator used in the first and second radiator array.

FIG. 2 shows an exemplary embodiment of the radiator 2 used in the first and in the second radiator array 5*a*, 5*b*. The radiator 2 comprises four radiator segments 2*a*, 2*b*, 2*c*, 2*d*, wherein each radiator segment 2*a*, 2*b*, 2*c*, 2*d* is aligned by an angle of approximately 90° relative to its adjacent radiator segment 2*a*, 2*b*, 2*c*, 2*d*. In that case, all four radiator segments 2*a*, 2*b*, 2*c*, 2*d* enclose the receiving room 4. A slot 6 separates the respective radiator segment 2*a*, 2*b*, 2*c*, 2*d* from its neighboring radiator segment 2*a*, 2*b*, 2*c*, 2*d*. The respective slots 6 are arranged in the area of the respective corner of the radiator 2. The radiator 2 has preferably a square shape. Each radiator segment 2*a*, 2*b*, 2*c*, 2*d* extends from the reflector arrangement 3. The radiator segments 2*a*, 2*b*, 2*c*, 2*d* preferably extend outwardly so that a cross section through the receiving room 4 enlargers over the height of the radiator 2.

Each radiator 2 comprises four feed sections 7*a*, 7*b*, 7*c*, 7*d*. In the whole description, the first feed section 7*a* of each radiator 2 is on the top left. The second feed section 7*b* of each radiator 2 is on the bottom left. The third feed section 7*c* of each radiator 2 is on the bottom right. The fourth feed section 7*d* of each radiator 2 is on the top right. Each feed section 7*a*, 7*b*, 7*c*, 7*d* can be connected to a coaxial cable 8. A coaxial cable 8 is shown comprising an inner conductor 8*a* and an outer conductor 8*b*. The coaxial cable 8 is configured to feed the third feed section 7*c*. The inner conductor 8*a* is soldered to the third radiator segment 2*c*, wherein the outer conductor 8*b* is soldered to the neighboring fourth radiator segment 2*d*.

As will be explained below, the mobile communication antenna 1 is able to transmit and receive a first mobile communication signal S1 of a first polarization, a second mobile communication signal S2 of a second polarization, a third mobile communication signal S3 of a first polarization and the fourth mobile communication signal S4 of a second polarization.

In the whole description, the first, second, third and fourth mobile communication signals S1, S2, S3, S4 are depicted by four different patterns. In FIG. 2 the presence of only a first and a second mobile communication signal S1, S2 is indicated by using different patterns in a circle. The first mobile communication signal S1 is fed to the first and the third feed sections 7*a*, 7*c*, wherein the second mobile communication signal S2 is fed to the second and the fourth feed sections 7*b*, 7*d*.

If the first mobile communication signal S1 is fed to the third feed section 7*c* and therefore to the third and to the fourth radiator segments 2*c*, 2*d* of the radiator 2 as indicated, then both radiator segments 2*c*, 2*d* are used to transmit the first mobile communication signal S1. The respective polarization vector is depicted with the dotted line. The same is also true if the first mobile communication signal S1 is fed to the first feed section 7*a*. The resulting polarization vector is also depicted with the dotted line. Contrary to that, if the second mobile communication signal S2 is fed to the second feed section 7*b*, the resulting polarization vector is depicted with the dashed line. The same is true if the second mobile communication signal S2 is fed to the fourth feed section 7*d*. The resulting polarization vector is also depicted with the dashed line.

In the following, the first polarization is a +45° polarization, wherein the second polarization is a −45° polarization. In that case, both polarization vectors are orthogonal to each other.

As a result, the first and the third feed sections 7*a*, 7*b* can be used to transmit a mobile communication signal of a first polarization, wherein the second and the fourth feed sections 7*b*, 7*d* can be used to transmit a mobile communication signal of a second polarization.

Since the radiator 2 in FIG. 2 only transmits and/or receives two different mobile communication signals S1, S2, it is also called a dual signal radiator 2*a*.

It can also be seen that the first and the third feed sections 7*a*, 7*c* are arranged diagonally spaced from each other, wherein the second and the fourth feed sections 7*b*, 7*d* are also diagonally spaced from each other. The distance between the first and the third feed section 7*a*, 7*c* preferably equals the distance between the second and the fourth feed section 7*b*, 7*d*.

In addition, the first feed section 7*a* is also located adjacent to the fourth feed section 7*d* (preferably at the same height) and a second feed section 7*b* is located adjacent to the third feed section 7*c* (preferably at the same height). In addition, the first feed section 7*a* is arranged (preferably only) at the longitudinal distance from the second feed section 7*b* and the fourth feed section 7*d* is arranged (preferably only) at a longitudinal distance from the third feed section 7*c*.

Figure 3:
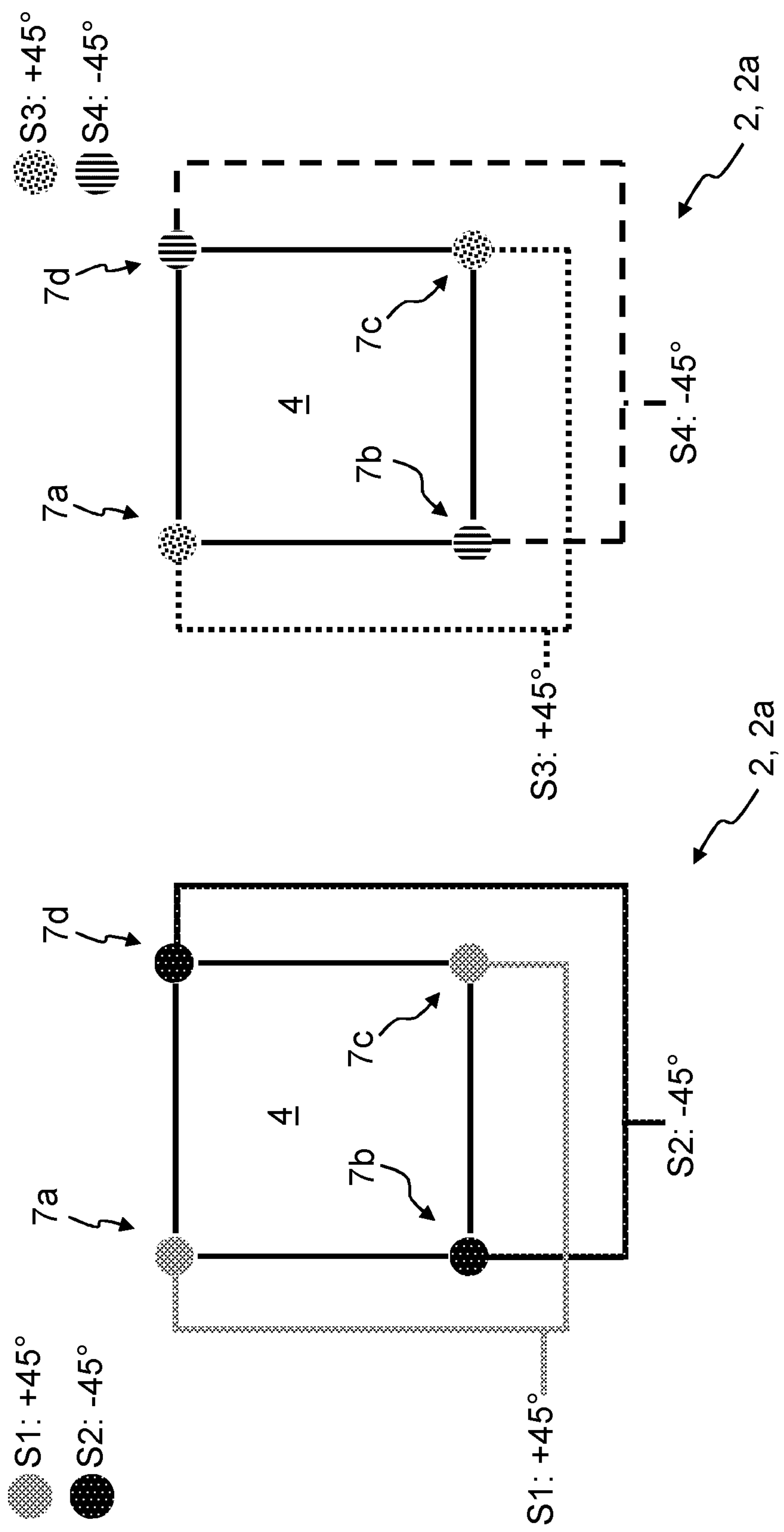
FIG. 3: an exemplary embodiment of a dual signal radiator in a first radiator array and in a second radiator array.

Within FIG. 3, two dual signal radiators 2*a* are shown. The dual signal radiator 2*a* on the left corresponds to the one already described within FIG. 2. However, as can be seen, the first and the third feed sections 7*a*, 7*c* are galvanically connected to each other. In addition, the second and the fourth feed sections 7*b*, 7*d* are also galvanically connected to each other. Because the dual signal radiator 2*a* is configured to transmit and/or receive the first mobile communication signal S1 with the first polarization at the first and the third feed section 7*a*, 7*c* and because the dual signal radiator 2*a* is configured to transmit and/or receive the second mobile communication signal S2 with the second polarization at the second and the fourth feed section 7*b*, 7*d*, the radiator 2 is also called a dual signal radiator 2*a* of a first type.

Contrary to that, the dual signal radiator 2*a* on the right is called a dual signal radiator 2*a* of a second type. This is because the dual signal radiator 2*a* is configured to transmit and/or receive the third mobile communication signal S3 with the first polarization at the first and the third feed section 7*a*, 7*c* and because the dual signal radiator 2*a* is also configured to transmit and/or receive the fourth mobile communication signal S4 with the second polarization at the second and the fourth feed section 7*b*, 7*d*.

Referring now to FIGS. 4A, 4B, 4C and 4D, multi-signal radiators 2*b* are shown. The physical structure of a multi signal radiator 2*b* basically corresponds to the one described in FIG. 2 and is preferably the same as for the dual signal radiator 2*a*.

A multi signal radiator 2*b* according to the present invention differs from a dual signal radiator 2*a* in that it can transmit and/receive four different mobile communication signals S1, S2, S3, S4 as indicated by four different patterns at the respective feed sections 7*a*, 7*b*, 7*c*, 7*d* at the corner of each radiator 2.

Figures 4A, 4B, 4C, 4D:
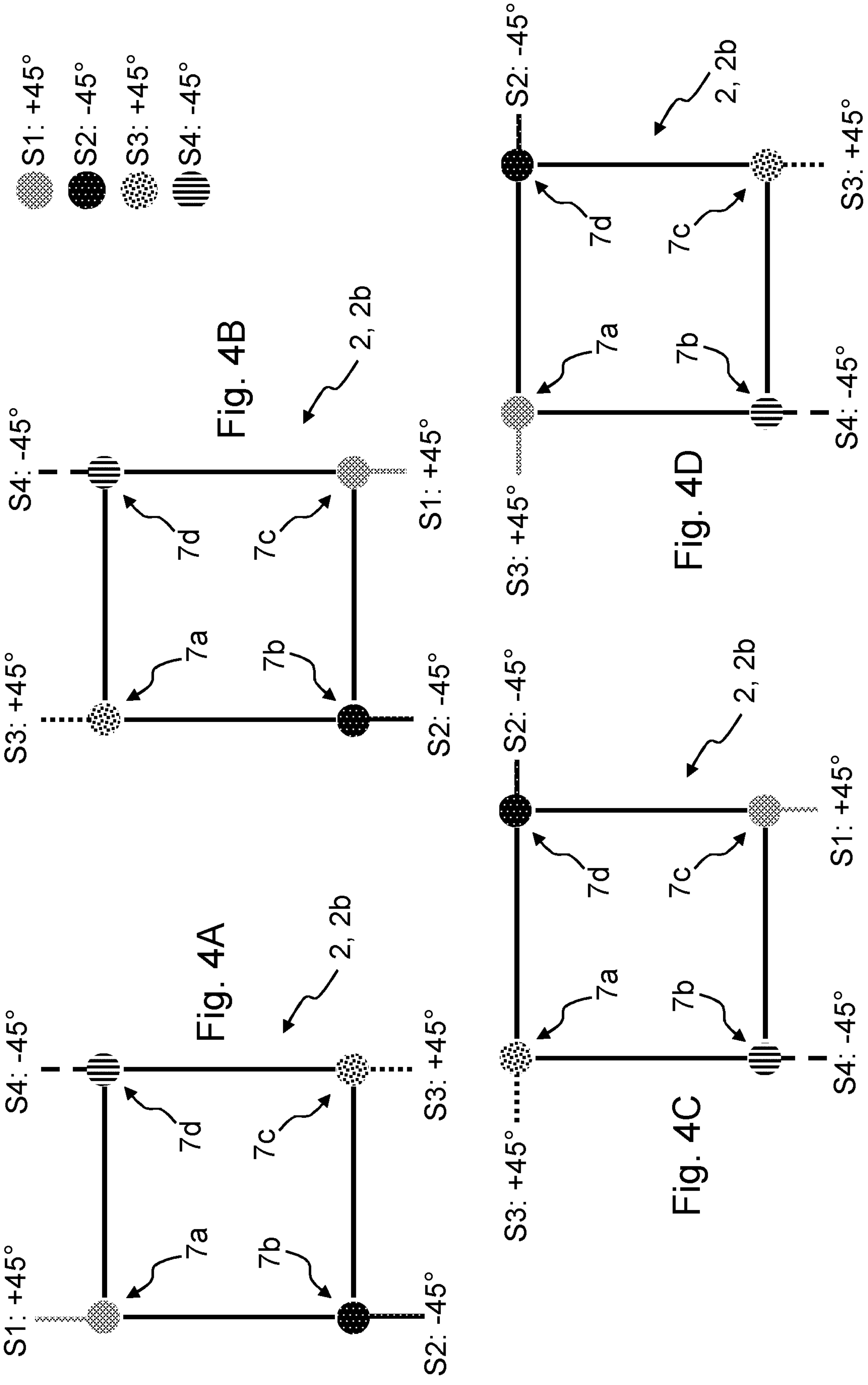
FIGS. 4A, 4B, 4C, 4D: different embodiments of multi signal radiators of type I, II, III, and IV.

The multi-signal radiator 2*b* in FIG. 4A is of type I, because it is configured to transmit and receive a first mobile communication signal S1 with a first polarization (i.e. +45°) at the first feed section 7*a*. It is further configured to transmit and receive a second mobile communication signal S2 with a second polarization (i.e.)−45° at the second feed section 7*b*. It is also configured to transmit and receive a third mobile communication signal S3 with the first polarization (i.e. +45°) at the third feed section 7*c*. It is also configured to transmit and receive of fourth mobile communication signal S4 with the second polarization (i.e.)−45° at the fourth feed section 7*d*.

The polarizations of the first mobile communication signal S1 and the third mobile communication signal S3 are the same. Furthermore, the polarizations of the second mobile communication signal S2 and the fourth mobile communication signal S4 art the same.

The multi-signal radiator 2*b* in FIG. 4B is of type II, because it is configured to transmit and receive a third mobile communication signal S3 with a first polarization (i.e. +45°) at the first feed section 7*a*. It is further configured to transmit and receive a second mobile communication signal S2 with a second polarization (i.e.)−45° at the second feed section 7*b*. It is also configured to transmit and receive a first mobile communication signal S1 with the first polarization (i.e. +45°) at the third feed section 7*c*. It is also configured to transmit and receive of fourth mobile communication signal S4 with the second polarization (i.e.)−45° at the fourth feed section 7*d*.

The multi-signal radiator 2*b* in FIG. 4C is of type III, because it is configured to transmit and receive a third mobile communication signal S3 with a first polarization (i.e. +45°) at the first feed section 7*a*. It is further configured to transmit and receive a fourth mobile communication signal S4 with a second polarization (i.e.)−45° at the second feed section 7*b*. It is also configured to transmit and receive a first mobile communication signal S1 with the first polarization (i.e. +45°) at the third feed section 7*c*. It is also configured to transmit and receive of second mobile communication signal S2 with the second polarization (i.e.)−45° at the fourth feed section 7*d*.

The multi-signal radiator 2*b* in FIG. 4D is of type IV, because it is configured to transmit and receive a first mobile communication signal S1 with a first polarization (i.e. +45°) at the first feed section 7*a*. It is further configured to transmit and receive a fourth mobile communication signal S4 with a second polarization (i.e.)−45° at the second feed section 7*b*. It is also configured to transmit and receive a third mobile communication signal S3 with the first polarization (i.e. +45°) at the third feed section 7*c*. It is also configured to transmit and receive of second mobile communication signal S2 with the second polarization (i.e.)−45° at the fourth feed section 7*d*.

Figure 5A:
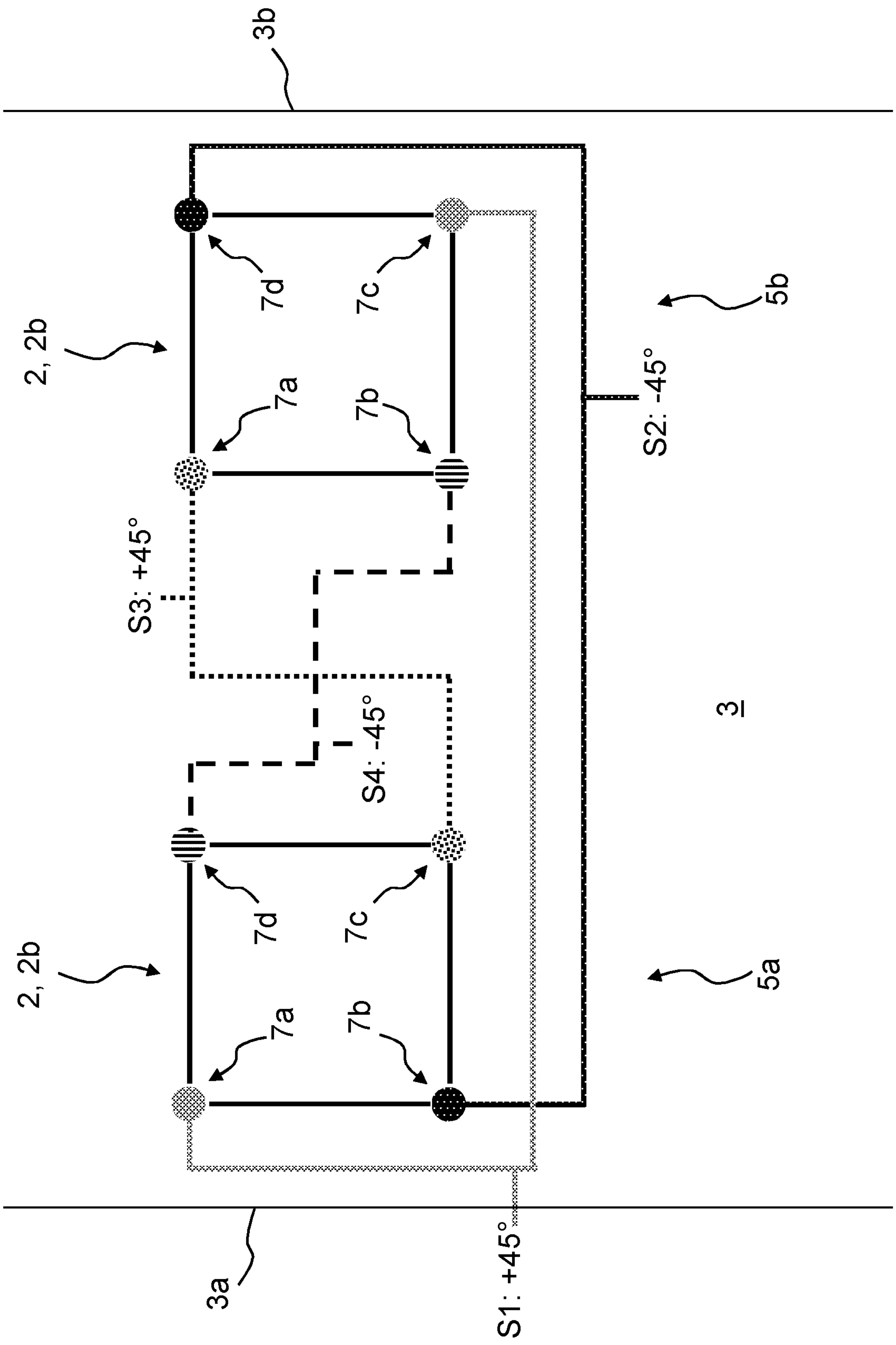
FIG. 5A: the use of a multi signal radiator of type I in the first radiator array and of a multi signal radiator of type III in the second radiator array.

FIG. 5A shows the use of a multi signal radiator 2*b* of type I in the first radiator array 5*a* and of a multi signal radiator 2*b* of type III in the second radiator array 5*b*. It can also be seen that the first feed section 7*a* of the multi signal radiator 2*b* in the first radiator array 5*a* is galvanically connected to the third feed section 7*c* of the multi signal radiator 2*b* in the second radiator array 5*b*. The same is also true for the second feed section 7*b* of the multi signal radiator 2*b* in the first radiator array 5*a* and the fourth feed section 7*d* of the multi signal radiator 2*b* in the second radiator array 5*b*. The same is also true for the third feed section 7*c* of the multi signal radiator 2*b* in the first radiator array 5*a* and the first feed section 7*a* of the multi signal radiator 2*b* in the second radiator array 5*b*. The same is also true for the fourth feed section 7*d* of the multi signal radiator 2*b* in the first radiator array 5*a* and the second feed section 7*b* of the multi signal radiator 2*b* in the second radiator array 5*b*.

In general, the respective feed sections 7*a*, 7*b*, 7*c*, 7*d* of a multi signal radiator 2*b* in the first radiator array 5*a* and in the second radiator array 5*b* which transmit and/or receive the same mobile communication signal S1, S2, S3, S4 (same signal, same polarization) are preferably galvanically connected to each other. However, the cable length from the respective feed sections 7*a*, 7*b*, 7*c*, 7*d* to the respective phase shifter 103*a*, 103*b*, 103*c*, 103*d* for example might be different to compensate for cross-eyed beams. In that case, the cable length from the third feed section 7*c* of the multi signal radiator 2*b* in the first radiator array 5*a* to the third phase shifter 103*a* differ from the cable length between the first feed section 7*a* of the multi signal radiator 2*b* in the second radiator array 5*b* to the third phase shifter 103*a*.

It can also be seen, that the first and the second feed sections 7*a*, 7*b* of the multi signal radiator 2*b* in the first radiator array 5*a* are arranged closer to the first (i.e. left) end 3*a* of the reflector arrangement 3 than the third and the fourth feed sections 7*c*, 7*d*. In general, the first and the second feed sections 7*a*, 7*b* of all radiators 2 (dual signal radiator, multi signal radiator) in the first radiator array 5*a* are therefore also called outer feed sections 7*a*, 7*b*, wherein the third and the fourth feed sections 7*c*, 7*d* of all radiators 2 in the first radiator array 5*a* which are adjacent to the second radiator array 5*b* are therefore also called inner feed sections 7*c*, 7*d*.

It can also be seen, that the third and the fourth feed sections 7*c*, 7*d* of the multi signal radiator 2*b* in the second radiator array 5*b* are arranged closer to the second (i.e. right) end 3*b* of the reflector arrangement 3 than the first and the second feed sections 7*a*, 7*b*. In general, the third and the fourth feed sections 7*c*, 7*d* of all radiators 2 (dual signal radiator, multi signal radiator) in the second radiator array 5*b* are therefore also called outer feed sections 7*c*, 7*d*, wherein the first and the second feed sections 7*a*, 7*b* of all radiators 2 in the second radiator array 5*b* which are adjacent to the first radiator array 5*a* are therefore also called inner feed sections 7*a*, 7*b*.

It can also be seen that the distance between the feed sections 7*a*, 7*b*, 7*c*, 7*d* of the multi signal radiators 2*b* in the first and the second radiator array 5*a*, 5*b* which are configured to transmit and/or receive the first and the second mobile communication signal S1, S2 is increased compared to the dual signal radiator 2*a* as described in FIG. 3. Therefore, the half power beam width is significantly reduced and the antenna gain is enhanced. The distance between the feed sections 7*a*, 7*b*, 7*c*, 7*d* of the multi signal radiators 2*b* in the first and the second radiator array 5*a*, 5*b* which are configured to transmit and/or receive the third and the fourth mobile communication signal S3, S4 is not or not significantly increased compared to the dual signal radiator 2*a* as described in FIG. 3. However, the first end 3*a* and the second end 3*b* of the reflector arrangement 3 protrudes further so that the half power beam width is significantly reduced and the antenna gain is enhanced.

Figure 5B:
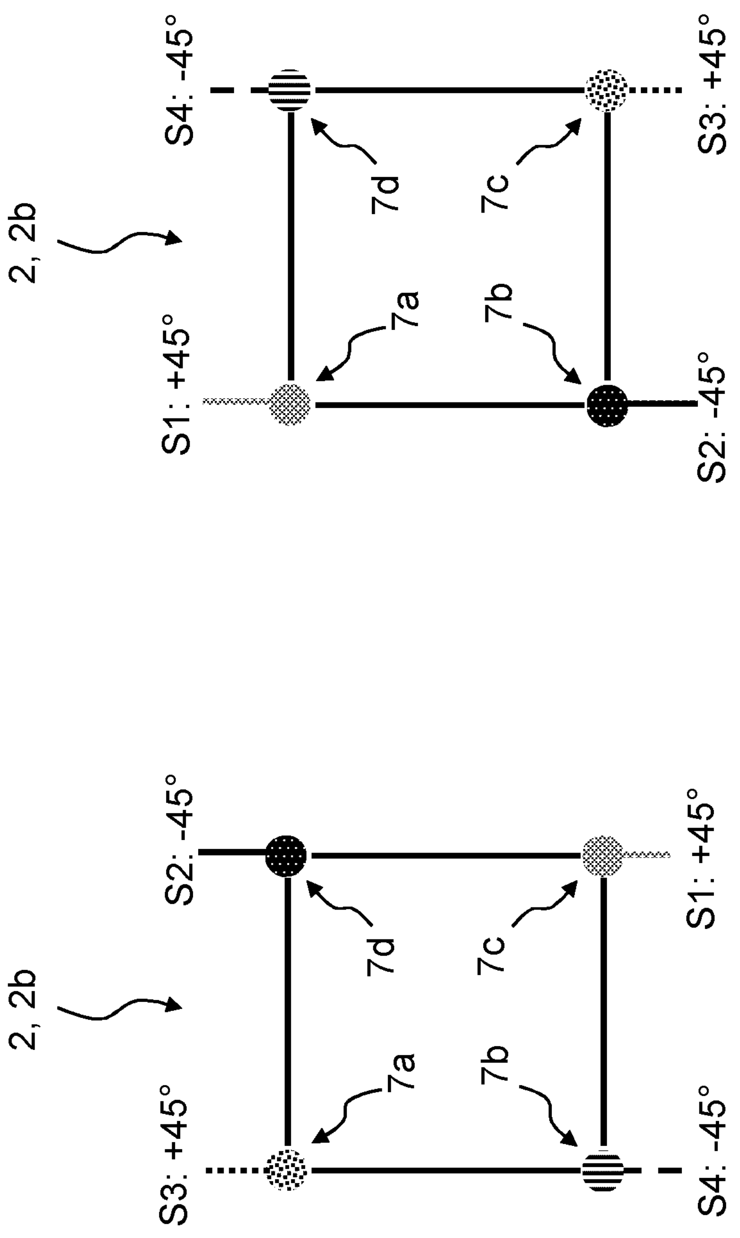
FIG. 5B: the use of a multi signal radiator of type III in the first radiator array and of a multi signal radiator of type I in the second radiator array.

FIG. 5B shows the use of a multi signal radiator 2*b* of type III in the first radiator array 5*a* and of a multi signal radiator 2*b* of type I in the second radiator array 5*b*. The results should be comparable to the embodiment shown in FIG. 5A.

Figure 5C:
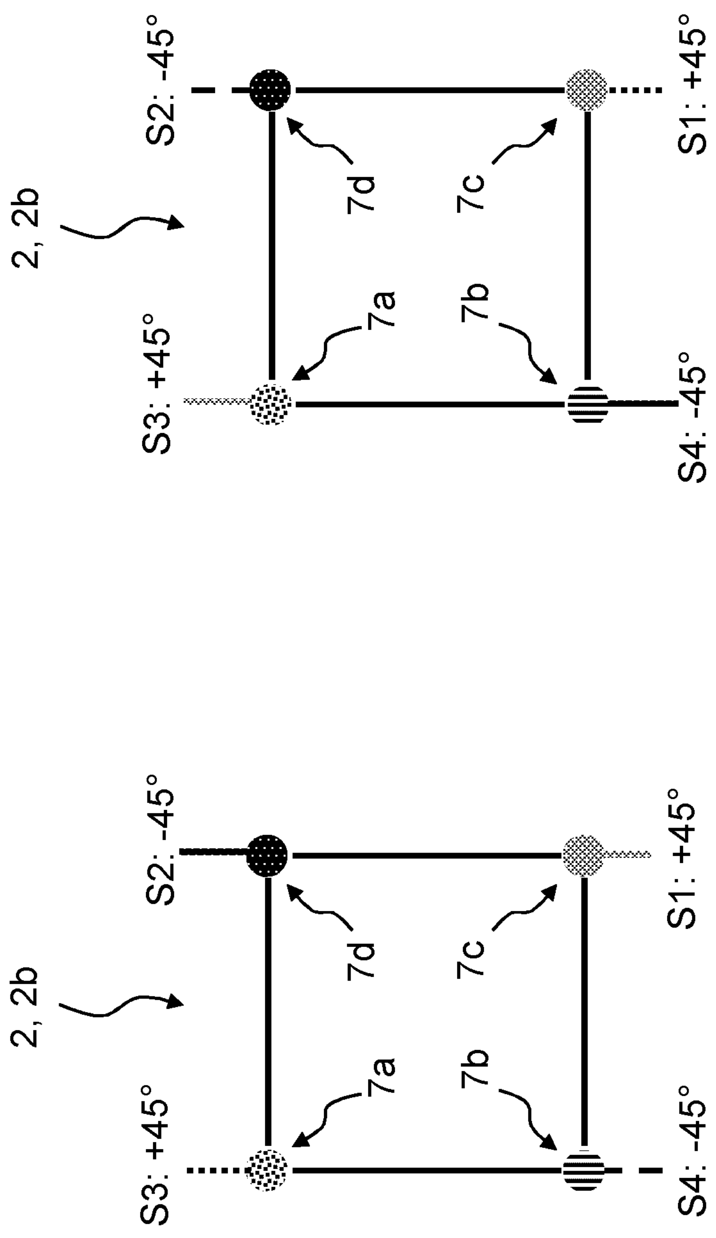
FIG. 5C: the use of a multi signal radiator of type III in the first radiator array and of a multi signal radiator of type III in the second radiator array.

FIG. 5C shows the use of a multi signal radiator 2*b* of type III in the first radiator array 5*a* and of a multi signal radiator 2*b* of type III in the second radiator array 5*b*.

Figure 5D:
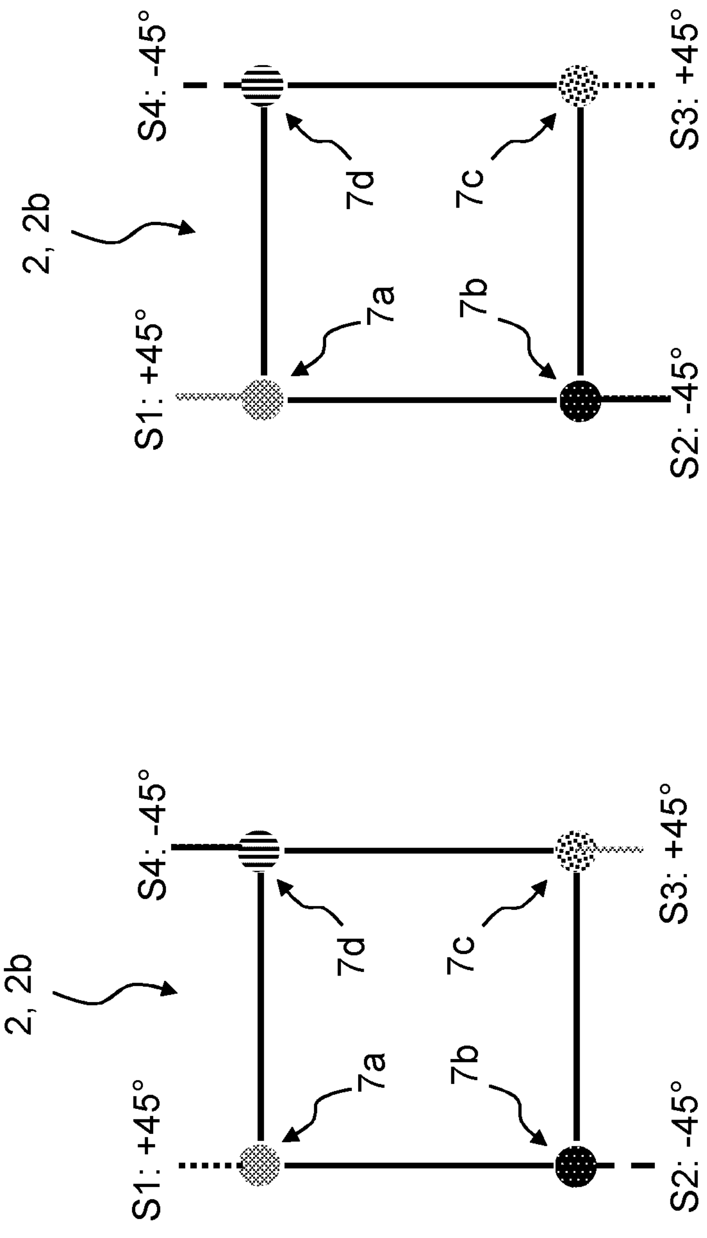
FIG. 5D: the use of a multi signal radiator of type I in the first radiator array and of a multi signal radiator of type I in the second radiator array.

FIG. 5D shows the use of a multi signal radiator 2*b* of type I in the first radiator array 5*a* and of a multi signal radiator 2*b* of type I in the second radiator array 5*b*.

It is also possible to select the multi signal radiator 2*b* in the first radiator array 5*a* from any of type I, II, III and IV and to select the multi signal radiator 2*b* in the second radiator array 5*b* from any of type I, II, III and IV.

Figure 6A:
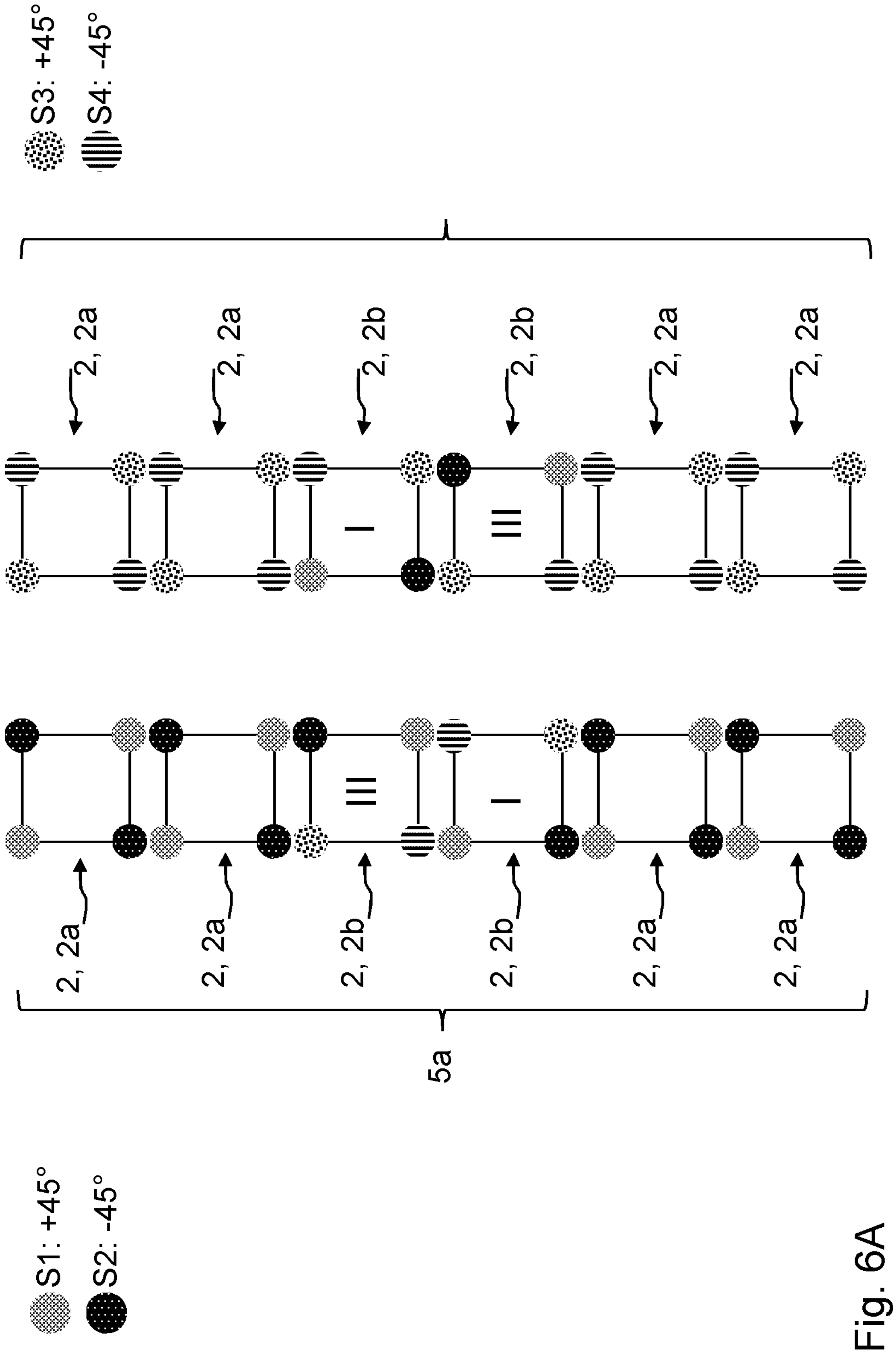
FIG. 6A: the first and the second radiator array comprising multi signal radiators and dual signal radiators.

FIG. 6A shows that the first and the second radiator array 5*a*, 5*b* comprise both multi signal radiators 2*b* and dual signal radiators 2*a*. The first radiator array 5*a* comprises m dual-polarized radiators 2 which are spaced apart from one another in the longitudinal direction, with m≥4, 5, 6, 7, 8, 9, 10, 11, 12, 13, 14. The second radiator array 5*b* comprises n dual-polarized radiators 2 which are spaced apart from one another in the longitudinal direction, with n≥4, 5, 6, 7, 8, 9, 10, 11, 12, 13, 14. Preferably m equals n. Within FIG. 6A, m equals 6 and n equals 6. However, the number of radiators in each radiator array 5*a*, 5*b* could also deviate. At least one multi signal radiator 2*b* of any type must be used in the first radiator array 5*a* and/or the second radiator array 5*b*. The remaining radiators 2 can be dual signal radiators 2*a* of the first and/or the second type. It could also be that all m radiators 2 in the first radiator array 5*a* and/or that all n radiators 2 in the second radiator array 5*b* are multi signal radiators 2*b* of any type. In that case, there would be no remaining radiators 2 in form of dual signal radiators 2*a*.

FIG. 6A also shows that the first radiator array 5*a* and the second radiator array 5*b* comprise an even number of radiators 2. However, two radiators 2 in the center of the first radiator array 5*a* are multi signal radiators 2*b*. One is of type III and the other one is of type I. In addition, two radiators 2 in the center of the second radiator array 5*b* are multi signal radiators 2*b*. One is of type I and the other one is of type III. Preferably, the first and the second radiator arrays 5*a*, 5*b* should comprise the same number of multi signal radiators 2*b* of the same type to make the mobile communication antenna 1 symmetrical. In FIG. 6A, each radiator array 5*a*, 5*b* comprises one multi signal radiator 2*b* of type I and one multi signal radiator 2*b* of type III.

The remaining radiators 2 are dual signal radiators 2*a*. More precisely, the remaining radiators 2 of the first radiator array 5*a* are preferably solely dual signal radiators 2*a* of the first type. In addition, the remaining radiators 2 of the second radiator array 5*b* are preferably solely dual signal radiators 2*a* of the second type. However, it could also be, that the first and/or the last radiator 2 of the first radiator array 5*a* is a dual signal radiator 2*a* of the second type, wherein the other remaining radiators 2 (if any available) of the first radiator array 5*a* would then be dual signal radiator is 2*a* of the first type. In addition, it could also be, that the first and/or the last radiator 2 of the second radiator array 5*b* is a dual signal radiator 2*a* of the first type, wherein the other remaining radiators 2 (if any available) of the second radiator array 5*b* would then be dual signal radiators 2*a* of the second type.

In FIG. 6A a multi signal radiator 2*b* in the first radiator array 5*a* is arranged at the same height as a multi signal radiator 2*b* in the second radiator array 5*b*. However, they are also arranged diagonally.

Figure 6B:
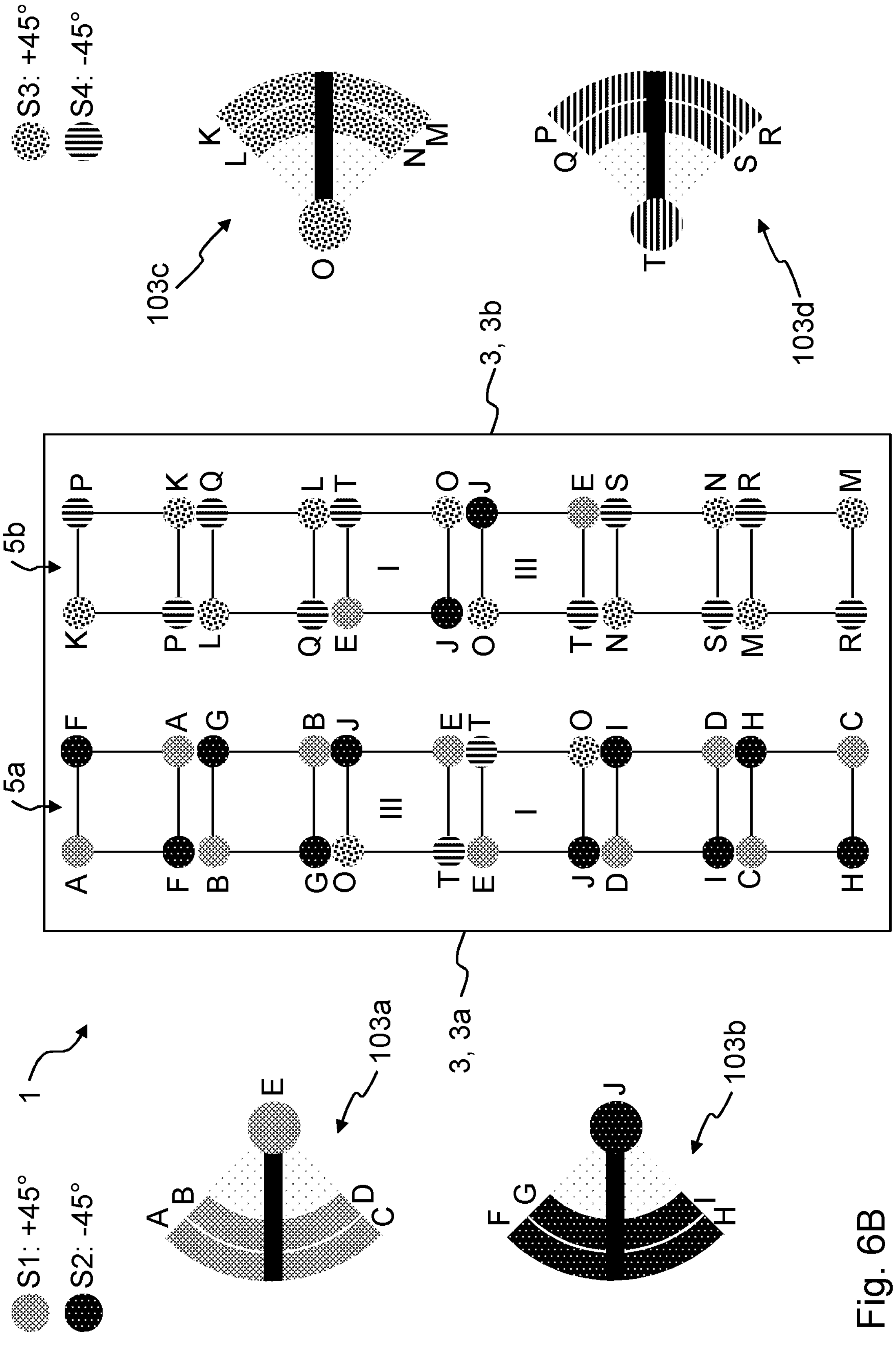
FIG. 6B: the first and the second radiator array, wherein the respective radiators are fed from different phase shifters.

FIG. 6B shows that the radiators 2 in the first and the second radiator array 5*a*, 5*b* are fed from different phase shifters 103*a*, 103*b*, 103*c*, 103*d*. There are four phase shifters 103*a*, 103*b*, 103*c*, 103*d* provided. A first phase shifter 103*a* is configured to feed a first mobile communication signal S1 with a first polarization with different phase angles (A, B, C, D, E) to at least some or all of the respective radiators 2 emitting this first mobile communication signal S1. In that case only the four multi signal radiators 2*b* in the center of the first and the second radiator array 5*a*, 5*b* emit the first mobile communication signal S1 with the same phase angle (E).

There is also a second phase shifter 103*b* that is configured to feed a second mobile communication signal S2 with the second polarization also with different phase angles to at least some or all of the respective radiators 2 emitting this second mobile communication signal S2.

There is also a third phase shifter 103*c* that is configured to feed a third mobile communication signal S3 with the first polarization also with different phase angles to at least some or all of the respective radiators 2 emitting this third mobile communication signal S3.

There is also a fourth phase shifter 103*d* that is configured to feed a fourth mobile communication signal S4 with the second polarization also with different phase angles to at least some or all of the respective radiators 2 emitting this fourth mobile communication signal S4.

All phase shifters 103*a*, 103*b*, 103*c*, 103*d* are preferably also configured to forward a mobile communication signal which the respective radiators 2 receive to the common port of the respective combiner 105 and/or to a signal processing device (for example a radio).

FIGS. 7A, 7B, 7C, 7D show different embodiments of the first and second radiator array 5*a*, 5*b*. Within FIG. 7A only the last radiator 2 in the first radiator array 5*a* and the second radiator array 5*b* is a multi signal radiator 2*b*. The last radiator 2 in the first radiator array 5*a* is a multi signal radiator 2*b* of type I. The last radiator 2 in the second radiator array 5*b* is a multi signal radiator 2*b* of type III. It could also be the first radiator 2 in the first and the second radiator array 5*a*, 5*b* that is a multi signal radiator 2*b*.

Figures 7A, 7B, 7C, 7D:
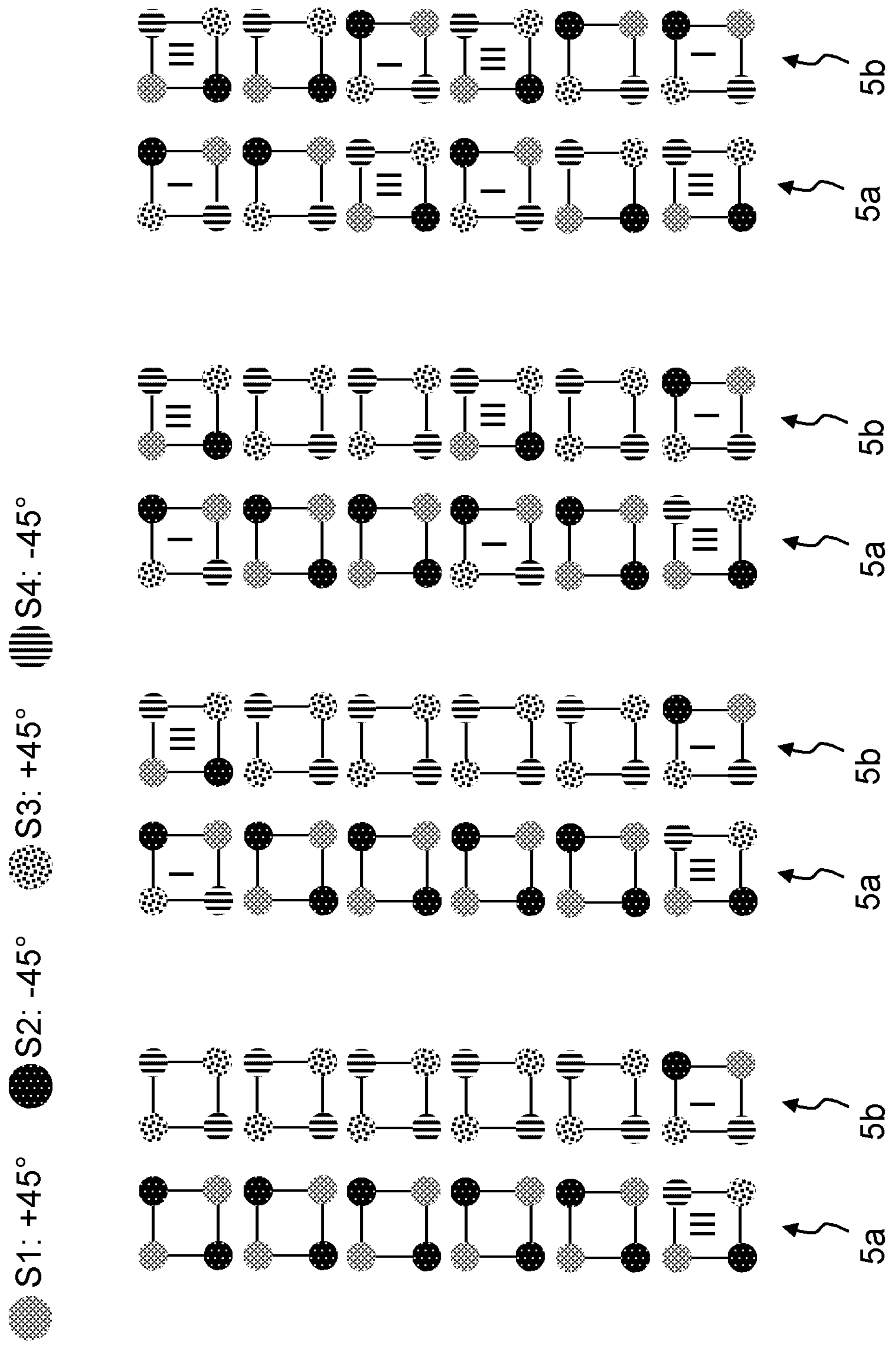
FIGS. 7A, 7B, 7C, 7D: different embodiments of first and second radiator arrays.

Within FIG. 7B the first and the last radiator 2 in the first radiator array 5*a* and the second radiator array 5*b* are multi signal radiators 2*b*. The first radiator 2 in the first radiator array 5*a* is a multi signal radiator 2*b* of type III. The first radiator 2 in the second radiator array 5*b* is a multi signal radiator 2*b* of type I. The last radiator 2 in the first radiator array 5*a* is a multi signal radiator 2*b* of type I. The last radiator 2 in the second radiator array 5*b* is a multi signal radiator 2*b* of type III. The type of the multi signal radiators 2*b* could also be switched.

FIG. 7C is similar to FIG. 7B. As a difference, the fourth radiator 2 in the first and the second radiator array 5*a*, 5*b* is a multi signal radiator 2*b*. The fourth radiator 2 in the first radiator array 5*a* is of type III and the fourth radiator 2 in the second radiator array 5*b* is of type I.

FIG. 7D is similar to FIG. 7C. As a difference, the third radiator 2 in the first and the second radiator array 5*a*, 5*b* is a multi signal radiator 2*b*. The third radiator 2 in the first radiator array 5*a* is of type I and the third radiator 2 in the second radiator array 5*b* is of type III.

In general, the number of multi band radiators 2*b* in each radiator array 5*a*, 5*b* is not limited. Each multi band radiator 2*b* can be picked from any of the types I, II, III, IV. The same is also true for the dual signal radiators 2*a*. Preferably the dual signal radiators 2*a* in the first radiator array 5*a* are of the first type and preferably the dual signal radiators 2*a* in the second radiator array 5*b* are of the second type. However, this does not always have to be the case.

Figure 8:
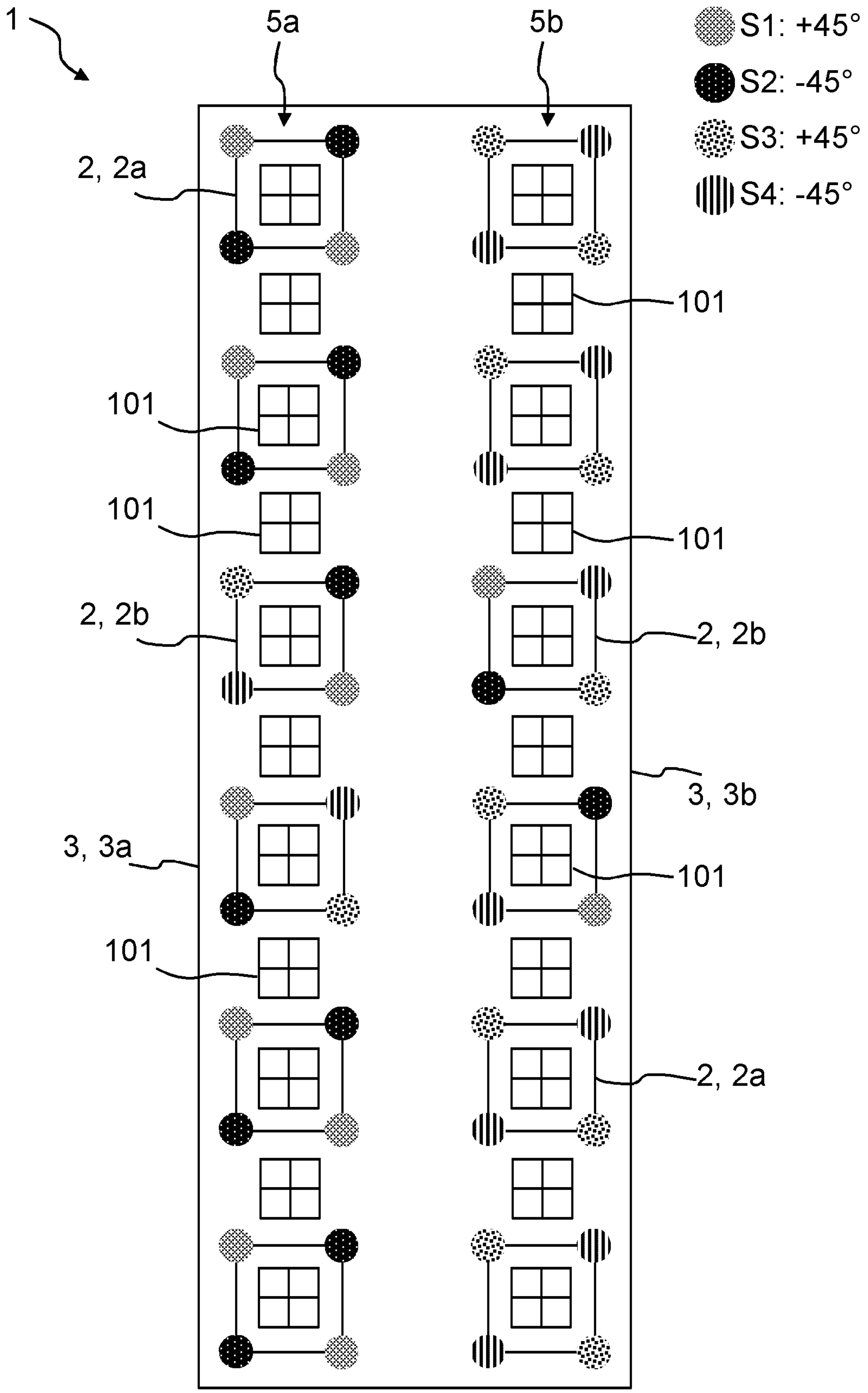
FIG. 8: an embodiment of a first and a second radiator array, wherein dual-polarized radiator systems are arranged within a radiator of the first and the second radiator array and between two radiators of the first and second radiator array.

FIG. 8 shows an embodiment of the first and the second radiator array 5*a*, 5*b*, wherein dual-polarized radiator systems 101 are arranged within a radiator 2 of the first and the second radiator array 5*a*, 5*b* and between two radiators 2 of each of the first and second radiator array 5*a*, 5*b*. The height of the dual-polarized radiator systems 101 is preferably the same as the height of the radiators 2. However, the dual-polarized radiator systems 101 could also be taller than the radiators 2 as indicated in FIG. 1. It can also be seen that two radiators 2 in each radiator array 5*a*, 5*b* located at the center of each radiator array 5*a*, 5*b* are multi signal radiators 2*b*.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A mobile communication antenna for transmitting and/or receiving mobile communication signals, comprising:

a reflector arrangement, which extends in a longitudinal direction of the mobile communication antenna;

a first radiator array, wherein the first radiator array comprises m dual-polarized radiators which are spaced apart from one another in the longitudinal direction, with m≥4; and a second radiator array, wherein the second radiator array comprises n dual-polarized radiators which are spaced apart from one another in the longitudinal direction, with n≥4, wherein the first and second radiator arrays are arranged side by side;

each radiator of the first radiator array comprises four feed sections for transmitting and receiving at least one mobile communication signal;

each radiator of the second radiator array comprises four feed sections for transmitting and receiving at least one mobile communication signal;

the first and third feed sections of each radiator are arranged diagonally spaced from each other and configured to transmit and receive mobile communication signals of a first polarization and the second and fourth feed sections of each radiator are arranged diagonally spaced from each other and configured to transmit and receive mobile communication signals of a second polarization;

at least one radiator of the first radiator array is configured to transmit and receive four different mobile communication signals via the first, second, third and fourth feed sections, thereby forming a multi signal radiator; and the remaining radiators of the first radiator array are configured to transmit and receive two different mobile communication signals of these four different mobile communication signals via the first, second, third and fourth feed sections, thereby forming a dual signal radiator.

2. The mobile communication antenna of claim 1, wherein for each radiator of the first and second radiator array:

a) the first feed section is located adjacent to the fourth feed section and the second feed section is located adjacent to the third feed section; and b) the first feed section is arranged at a longitudinal distance from the second feed section and the fourth feed section is arranged at a longitudinal distance from the third feed section;

for radiators of the first radiator array:

a) the first and second feed sections are outer feed sections located adjacent to a first end of the reflector arrangement; and b) the third and fourth feed sections are inner feed sections located adjacent to the second radiator array;

for radiators of the second radiator array:

a) the first and second feed sections are inner feed sections located adjacent to the first radiator array; and b) the third and fourth feed sections are outer feed sections located adjacent to a second end of the reflector arrangement.

3. The mobile communication antenna of claim 1, wherein the dual signal radiator is of a first type if it is configured to:

a) transmit and receive a first mobile communication signal with a first polarization at the first feed section;

b) transmit and receive a second mobile communication signal with a second polarization at the second feed section;

c) transmit and receive a first mobile communication signal with a first polarization at the third feed section; and d) transmit and receive a second mobile communication signal with a second polarization at the fourth feed section;

and/or the dual signal radiator is of a second type, if it is configured to:

a) transmit and receive a third mobile communication signal with a first polarization at the first feed section;

b) transmit and receive a fourth mobile communication signal with a second polarization at the second feed section;

c) transmit and receive a third mobile communication signal with a first polarization at the third feed section; and d) transmit and receive a fourth mobile communication signal with a second polarization at the fourth feed section.

4. The mobile communication antenna of claim 3, wherein the remaining radiators of the first radiator array are solely dual signal radiators of the first type; or the first and/or the last radiator of the first radiator array is a dual signal radiator of the second type, wherein the other remaining radiators of the first radiator array are dual signal radiators of the first type;

and/or the remaining radiators of the second radiator array are solely dual signal radiators of the second type; or the first and/or the last radiator of the second radiator array is a dual signal radiator of the first type, wherein the other remaining radiators of the second radiator array are dual signal radiators of the second type.

5. The mobile communication antenna of claim 1, wherein at least one or at least two multi signal radiators are arranged both in the first radiator array and in the second radiator array.

6. The mobile communication antenna of claim 5, wherein a multi signal radiator in the first radiator array is arranged at the same height as a multi signal radiator in the second radiator array; and/or a multi signal radiator in the first radiator array is diagonally spaced to a multi signal radiator in the second radiator array.

7. The mobile communication antenna of claim 5, wherein the respective feed sections of a multi signal radiator in the first radiator array which transmit and receive the same mobile communication signal as the feed sections of a diagonally spaced or at the same height arranged multi signal radiator in the second radiator array are galvanically connected to one another.

8. The mobile communication antenna of claim 1, wherein the multi signal radiator is a multi signal radiator of a first type (I) if it is configured to:

a) transmit and receive a first mobile communication signal with a first polarization at the first feed section;

b) transmit and receive a second mobile communication signal with a second polarization at the second feed section;

c) transmit and receive a third mobile communication signal with a first polarization at the third feed section;

d) transmit and receive a fourth mobile communication signal with a second polarization at the fourth feed section;

and/or the multi signal radiator is a multi signal radiator of a second type (II) if it is configured to:

a) transmit and receive a third mobile communication signal with a first polarization at the first feed section;

b) transmit and receive a second mobile communication signal with a second polarization at the second feed section;

c) transmit and receive a first mobile communication signal with a first polarization at the third feed section;

d) transmit and receive a fourth mobile communication signal with a second polarization at the fourth feed section;

and/or the multi signal radiator is a multi signal radiator of a third type (III) if it is configured to:

a) transmit and receive a third mobile communication signal with a first polarization at the first feed section;

b) transmit and receive a fourth mobile communication signal with a second polarization at the second feed section;

c) transmit and receive a first mobile communication signal with a first polarization at the third feed section;

d) transmit and receive a second mobile communication signal with a second polarization at the fourth feed section;

and/or the multi signal radiator is a multi signal radiator of a fourth type (IV) if it is configured to:

a) transmit and receive a first mobile communication signal with a first polarization at the first feed section;

b) transmit and receive a fourth mobile communication signal with a second polarization at the second feed section;

c) transmit and receive a third mobile communication signal with a first polarization at the third feed section;

d) transmit and receive a second mobile communication signal with a second polarization at the fourth feed section.

9. The mobile communication antenna of claim 8, wherein the first radiator array comprises at least one, two, three or at least four multi signal radiators, the respective multi signal radiator being of type I, II, III or type IV; and/or the second radiator array comprises at least one, two, three or at least four multi signal radiators, the respective multi signal radiator being of type I, II, III or type IV.

10. The mobile communication antenna of claim 8, wherein the first radiator in the first radiator array is a multi signal radiator of type I and/or III and/or the last radiator in the first radiator array is a multi signal radiator of type III and/or I;

and/or the first radiator in the second radiator array is a multi signal radiator of type III and/or I and/or the last radiator in the second radiator array is a multi signal radiator of type I and/or III.

11. The mobile communication antenna of claim 8, wherein m is an even number, wherein the two radiators in the center of the first radiator array are multi signal radiators of type I and/or III;

n is an even number, wherein the two radiators in the center of the second radiator array are multisignal radiators of type III and/or I.

12. The mobile communication antenna of claim 1, wherein a first phase shifter is configured to feed a first mobile communication signal with a first polarization with different phase angles to at least some or all of the respective radiators emitting this first mobile communication signal;

a second phase shifter is configured to feed a second mobile communication signal with a second polarization with different phase angles to at least some or all of the respective radiators emitting this second mobile communication signal;

a third phase shifter is configured to feed a third mobile communication signal with a first polarization with different phase angles to at least some or all of the respective radiators emitting this third mobile communication signal; and a fourth phase shifter is configured to feed a fourth mobile communication signal with a second polarization with different phase angles to at least some or all of the respective radiators emitting this fourth mobile communication signal.

13. The mobile communication antenna of claim 1, wherein the first mobile communication signal having a first polarization has a bandwidth which corresponds to a part of the bandwidth of a first mobile communication band having the first polarization or which corresponds to the entire first mobile communication band having the first polarization;

the second mobile communication signal having a second polarization has a bandwidth which corresponds to a part of the bandwidth of a first mobile communication band having the second polarization or which corresponds to the entire first mobile communication band having the second polarization;

the third mobile communication signal having a first polarization has a bandwidth which corresponds to a part of the bandwidth of a second mobile communication band having the first polarization or which corresponds to the entire second mobile communication band having the first polarization; and the fourth mobile communication signal having a second polarization has a bandwidth which corresponds to a part of the bandwidth of a second mobile communication band having the second polarization or which corresponds to the entire second mobile communication band having the second polarization.

14. The mobile communication antenna of claim 1, wherein each radiator of the first radiator array and each radiator of the second radiator array comprises four radiator segments, wherein each radiator segment is arranged rotated by approximately 90° relative to its adjacent radiator segments so that the four radiator segments define a receiving room;

two radiator segments join each other forming a corner, wherein the respective feed section is arranged in the area of the respective corner.

15. The mobile communication antenna of claim 14, wherein a plurality of dual-polarized radiator systems are provided, which are configured to transmit and/or receive mobile communication signals in two different polarizations;

the plurality of dual-polarized radiator systems are configured to be operable in a frequency range which is above the frequency range of the radiators of the first and second radiator array;

one dual-polarized radiator system each is arranged in a receiving room of several or all radiators of the first and/or second radiator array;

one dual-polarized radiator system each is arranged between two radiators of the first and/or second radiator array.

16. The mobile communication antenna of claim 1, wherein at least one radiator of the second radiator array is configured to transmit and receive four different mobile communication signals via the first, second, third and fourth feed sections, thereby forming a multi signal radiator, and the remaining radiators of the second radiator array are configured to transmit and receive two different mobile communication signals of these four different mobile communication signals via the first, second, third and fourth feed sections, thereby forming a dual signal radiator.

* * * * *